US 6,591,788 B2

(12) United States Patent
Hughes et al.

(10) Patent No.: US 6,591,788 B2
(45) Date of Patent: Jul. 15, 2003

(54) ROOFTOP WATER HEATER

(75) Inventors: Dennis R. Hughes, Hartford, WI (US); Marc W. Akkala, Cedarburg, WI (US); Kevin M. Field, Oconomowoc, WI (US); Randy T. Meyer, Garland, TX (US)

(73) Assignee: AOS Holding Company, Wilmington, DE (US)

( * ) Notice: Subject to any disclaimer, the term of this patent is extended or adjusted under 35 U.S.C. 154(b) by 109 days.

(21) Appl. No.: 09/732,472

(22) Filed: Dec. 7, 2000

(65) Prior Publication Data

US 2002/0069868 A1 Jun. 13, 2002

(51) Int. Cl.⁷ ................................. F24H 1/00
(52) U.S. Cl. .................... 122/13.01; 122/149; 122/136; 122/14.22; 410/162
(58) Field of Search ............................. 122/233, 135.1, 122/136 R, 155.1, 13.01, 15.1, 19.2, 19.1, 235.11, 235.15

(56) References Cited

U.S. PATENT DOCUMENTS

| | | | | |
|---|---|---|---|---|
| 1,847,431 A | * | 3/1932 | Hanna | ......................... 122/149 |
| 3,903,868 A | * | 9/1975 | Salvo | ...................... 122/136 R |
| 4,497,281 A | | 2/1985 | Markus | |
| 4,501,232 A | | 2/1985 | Gordbegli et al. | |
| 4,771,762 A | * | 9/1988 | Bridegum | ................. 122/14.22 |
| 4,785,792 A | | 11/1988 | Saint Laurent | |
| 4,867,106 A | * | 9/1989 | Staats | ......................... 110/162 |
| 4,875,465 A | | 10/1989 | Kramer | |
| 4,917,077 A | | 4/1990 | Scanferla | |
| 4,981,112 A | * | 1/1991 | Adams et al. | ............... 122/149 |
| 5,582,026 A | | 12/1996 | Barto, Sr. | |
| 5,713,310 A | | 2/1998 | Lemke | |
| 5,749,415 A | | 5/1998 | Dinh | |
| 5,761,379 A | | 6/1998 | Lannes | |
| 5,915,960 A | | 6/1999 | Check et al. | |

FOREIGN PATENT DOCUMENTS

JP    2000304351 A    11/2000

* cited by examiner

Primary Examiner—Carl D. Friedman
Assistant Examiner—Steve Varner
(74) Attorney, Agent, or Firm—Michael Best & Friedrich LLP

(57) ABSTRACT

A water heater adapted to be mounted on the rooftop of a building includes a substantially cylindrical tank having a horizontally-oriented longitudinal axis. A U-shaped flue tube has a burner end and an exhaust end, both ends being mounted in a head portion of the tank. The legs of the flue tube define a flue plane that is preferably angled 30°–60° with respect to vertical. An inlet tube and an outlet tube also extend through the head of the tank. The inlet tube is positioned at the bottom of the tank and has holes that open downwardly only; the outlet tube is positioned at the top of the tank and has holes that open upwardly only. The tank is weather-tightly enclosed by a cabinet. A base member of the cabinet is supported by a roof curb and supports the water tank. The base member includes a drain opening for draining water from the inside the cabinet to the sewage system of the building, and a water pipe opening through which extend a plurality of pipes communicating with the tank. A grommet weather-tightly seals the pipes with respect to the base member.

25 Claims, 7 Drawing Sheets

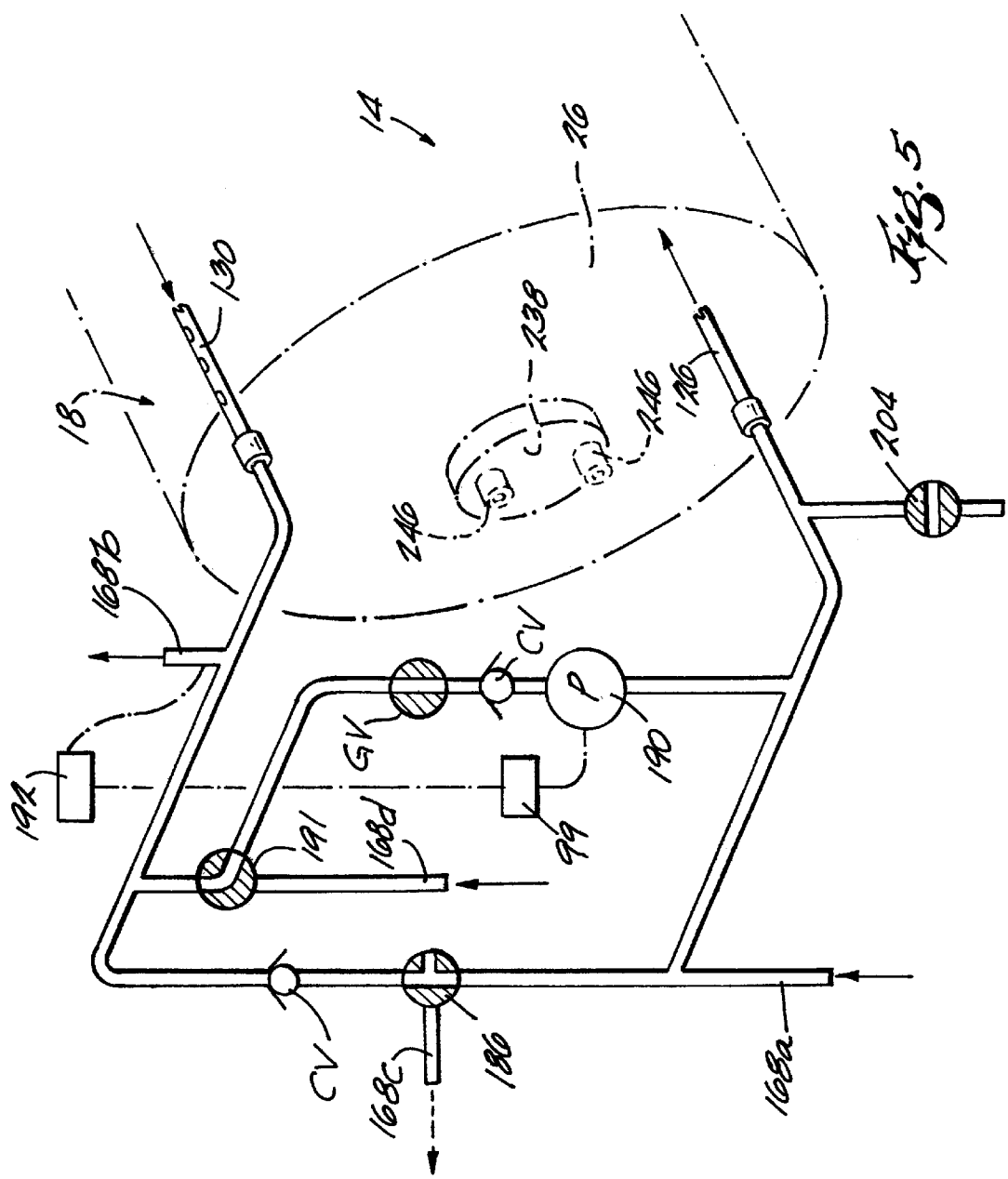

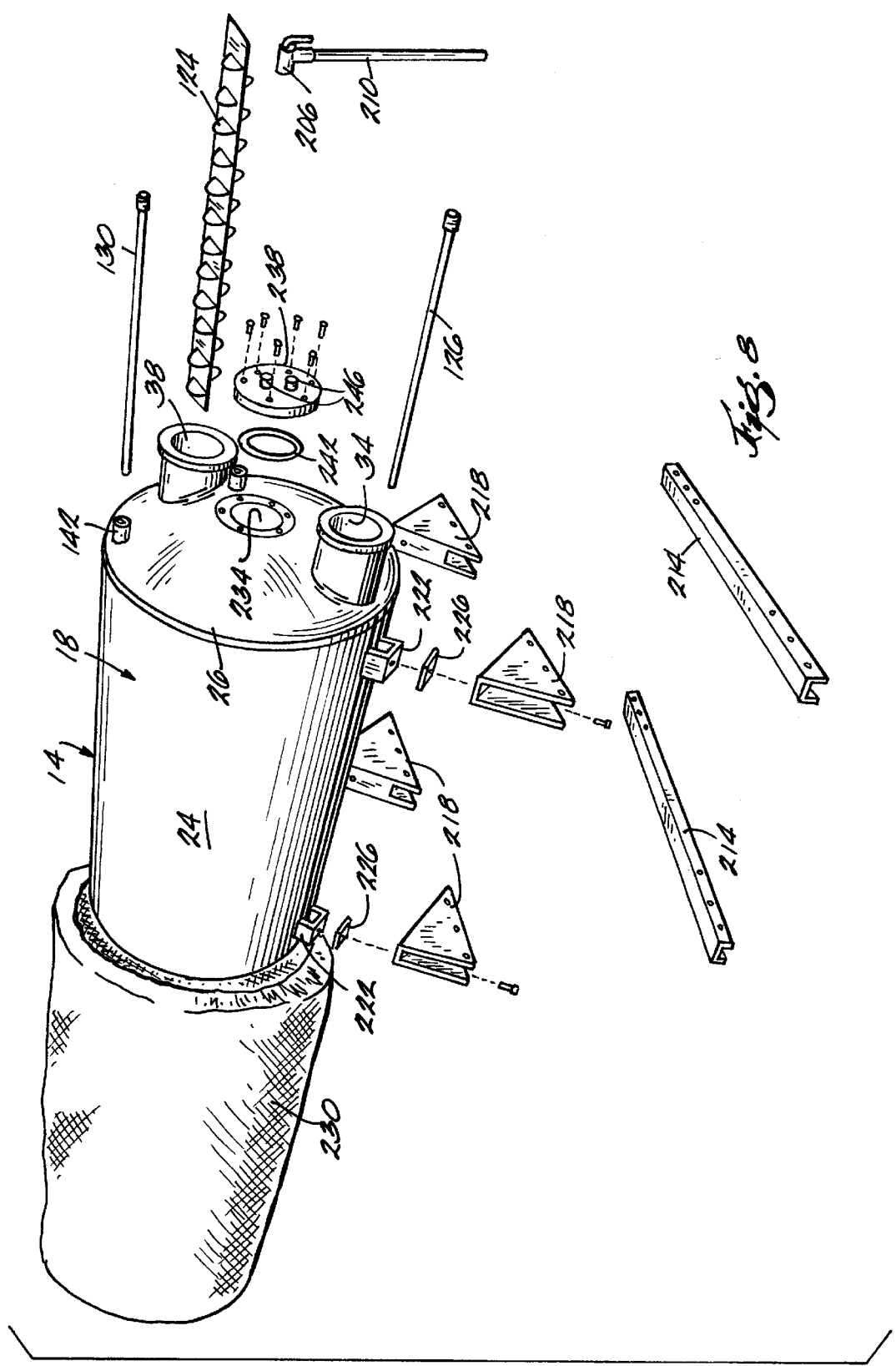

ROOFTOP WATER HEATER

FIELD OF THE INVENTION

The invention relates to water heaters, and more particularly to water heaters adapted to be mounted on the roof of a building.

BACKGROUND

It is known to provide a water heater within a building, and to mount other equipment (e.g., HVAC equipment) on the roof of a building. A primary concern with rooftop equipment is the load imposed on the roof by the weight of the equipment. Most rooftop equipment is supported on the roof by a roof curb. The roof curb provides a weather-tight seal between the equipment and the roof, and distributes the weight load of the equipment to the building's roof. The roof curb also prevents leakage of water into the building and equipment in the event of a roof flood. Roof curbs are typically built to match the pitch of the roof so that the equipment mounts on a level surface. Rooftop equipment is typically raised to the roof with a crane and set on the roof curb. A foam sealing tape is often used between the bottom of the equipment and the roof curb to provide a weather-tight seal.

Many commercial buildings include a wall around the rooftop to screen the rooftop equipment from view. Much of the HVAC equipment currently installed on rooftops is enclosed in a rectangular cabinet, and has a sufficiently low profile to be not visible from the ground level.

SUMMARY

The present invention identifies several advantages to providing a water heater on the roof of a building. In commercial applications, one factor affecting many aspects of some businesses, and particularly retail and restaurant businesses, is floor space. Moving a water heater out of a building and positioning it on the building's roof may permit more floor space to be used for conducting business. In addition to potentially freeing up floor space and the need for a separate boiler room in a building, the present invention provides other advantages over interior water heaters. For example, the design of interior water heaters must account for such considerations as flooding, CO generation, interior noise, some fire hazards arising from flammable vapors, building depressurization, and exhaust venting. While interior water heaters are sometimes limited to a significant degree by such design concerns, a rooftop water heater embodying the present invention is typically not affected to the same extent. This may make design and maintenance of the rooftop water heater simpler and cheaper in some instances when compared to the design and maintenance of interior water heaters.

Several design parameters are imposed on the design of a rooftop water heater by weather conditions and the expectations of potential purchasers of such water heaters. The water heater must first account for weather conditions not normally encountered by interior water heaters. It would be desirable to mount the water heater on a weather-tight roof curb that would support the water heater above expected water levels in the event of a roof flood. The roof curb would also provide the required weight load distribution to the roof. Because roof curbs are already used to support other rooftop equipment, it is convenient to use a roof curb to support a rooftop water heater as well.

To maintain the aesthetics of their buildings, purchasers would likely want equipment that cannot be ordinarily seen from the ground level. The water heater therefore must have a sufficiently low profile and be of substantially the same height as most HVAC equipment to meet the expected demands of purchasers.

In light of the foregoing considerations, the present invention provides a rooftop water heater that includes a water tank mounted on a base member which is in turn mounted on a roof curb. The base member includes a drain communicating with the building's sewage system so that water leaking or otherwise flowing out of the water tank is drained away from the water heater without causing damage to the roof or the water heater itself. A pair of rails may be mounted under the base member such that the water heater and base member may be moved with a fork lift. The rails also include holes for accepting the hooks of a lifting crane for raising the water heater to the roof of the building.

The water tank is preferably generally cylindrical in shape with a longitudinal axis extending substantially horizontally. In this regard, the tank has a low profile compared to a tank having its longitudinal axis extending vertically. A head encloses one end of the tank. A plurality of water pipes extend up through the roof curb and through a water pipe aperture in the base member. A vertical wall surrounds the water pipe aperture. A grommet fits over the vertical wall and seals the water pipes with respect to the base member.

A plurality of panels, including a cabinet door and a top, are preferably interconnected with and supported by the base member to substantially weather-tightly enclose the water tank. The top and cabinet door may be removed from the other panels to permit access to the water tank.

A U-shaped flue tube is preferably contained within the water tank. A baffle or turbulator is positioned within one of the legs of the U-shaped flue tube. The ends of the flue tube extend through the head of the tank. The legs each include a longitudinal axis, and the longitudinal axes together define a flue plane that may be disposed substantially vertically, or may be angled with respect to vertical. Preferably, the flue plane is angled in the range of 30–60° with respect to vertical.

The water heater also includes inlet and outlet tubes for providing cold water to the tank and drawing hot water from the tank, respectively. The inlet and outlet tubes extend substantially the entire inside length of the tank, and preferably include a plurality of apertures facing in a single direction. The outlet tube is positioned in the top portion of the tank with its apertures facing up while the inlet tube is positioned in the bottom portion of the tank with its apertures facing down. Preferably, the inlet and outlet tubes extend through the head of the tank, but in an alternative construction, the inlet and outlet tubes include elbows that extend through the tank shell.

Other features and advantages of the invention will become apparent to those skilled in the art upon review of the following detailed description, claims, and drawings.

BRIEF DESCRIPTION OF THE DRAWINGS

FIG. 5 is a schematic illustration of the piping system associated with the tank assembly of FIG. 4.

FIG. 7 is a perspective view of the tank assembly of FIG. 4 with selected elements removed for the purpose of illustration.

FIG. 8 is an exploded view of the tank assembly of FIGS. 4 and 7.

Figure 1:
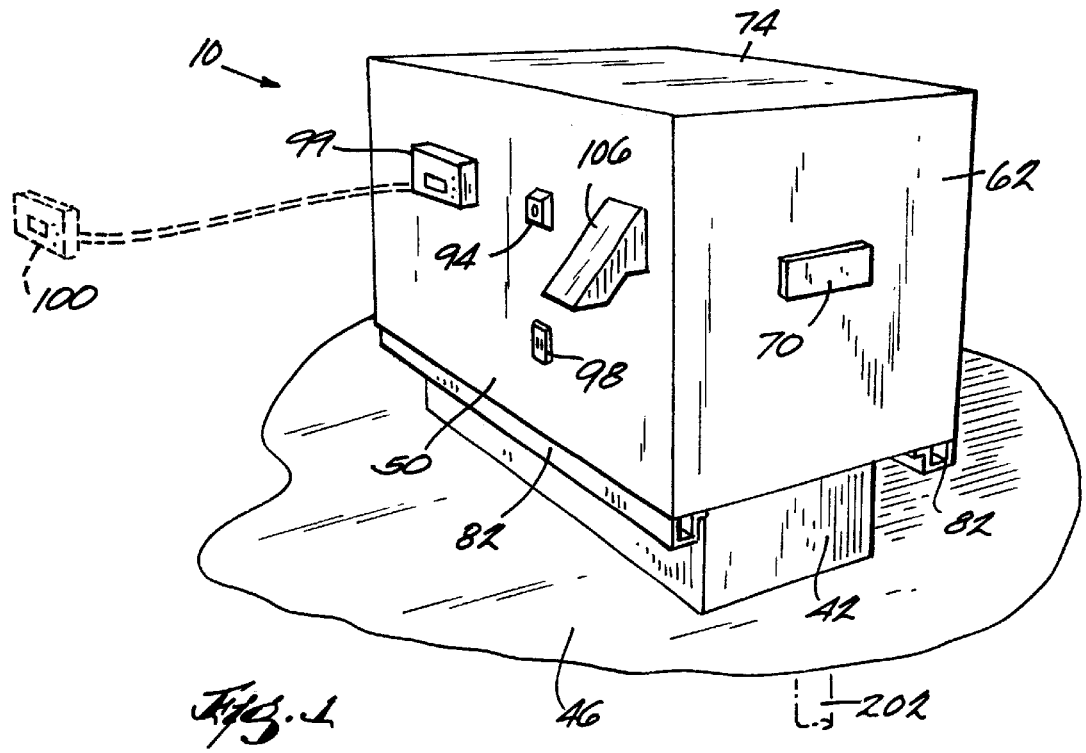
FIG. 1 is a perspective view of a water heater embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 2:
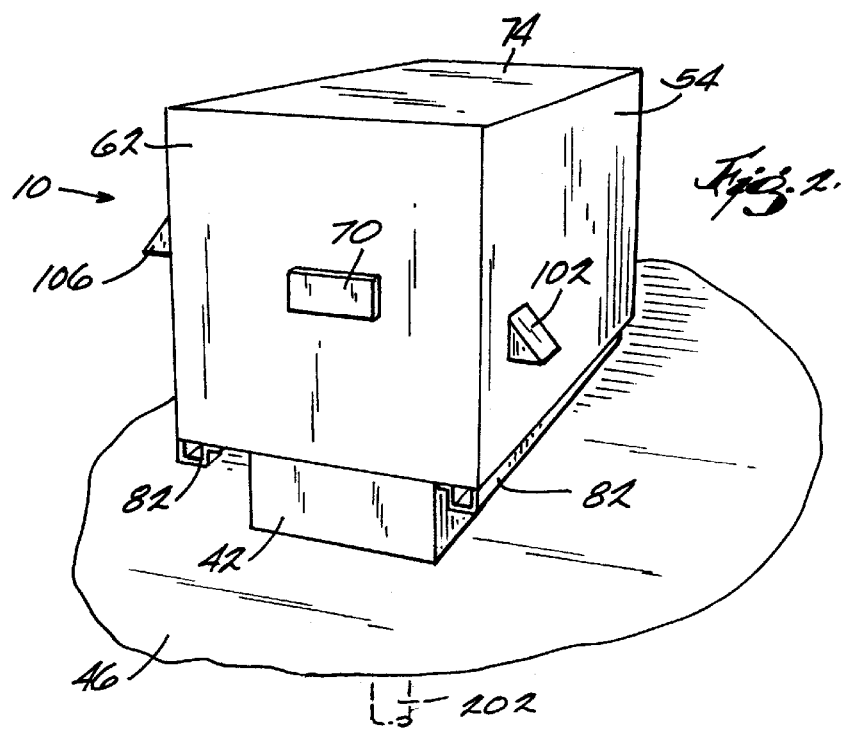
FIG. 2 is a view of the water heater of FIG. 1 from a different perspective.
Figure 3:
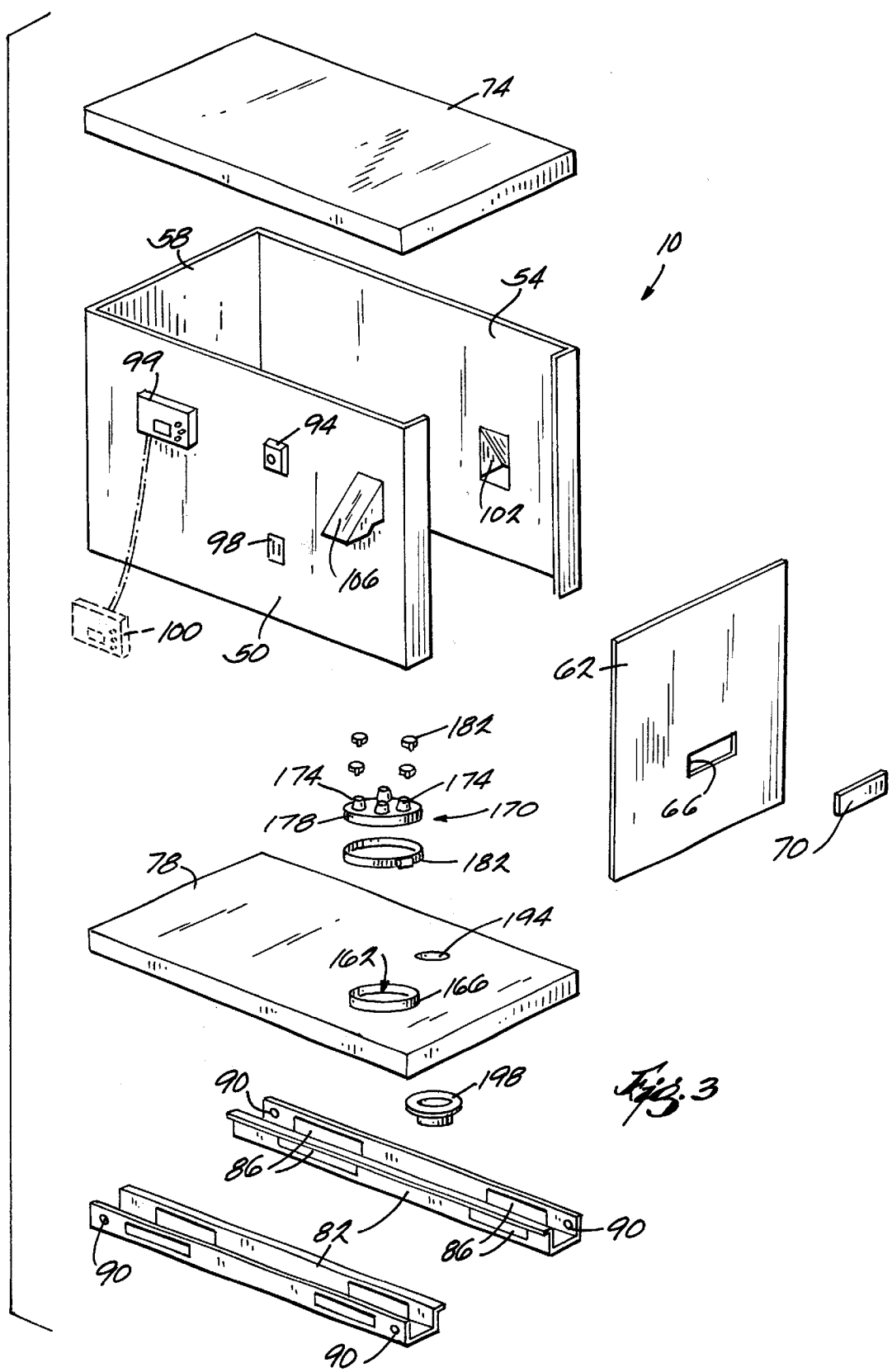
FIG. 3 is an exploded view of the cabinet of the water heater of FIG. 1.
Figure 10:
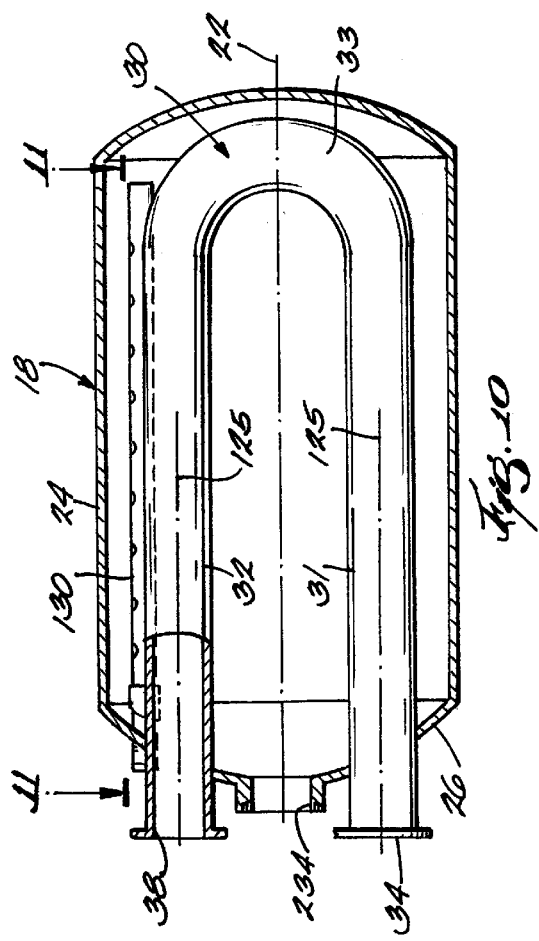
FIG. 10 is a side cross-section view of the tank assembly taken along line 10—10 in FIG. 9.
Figure 9:
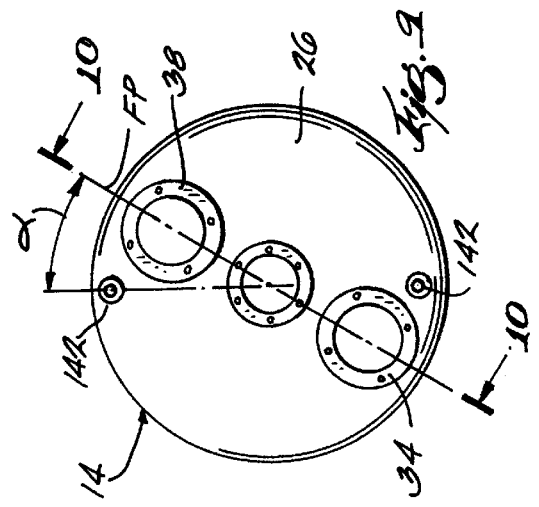
FIG. 9 is an end view of the tank assembly of FIGS. 4 and 7.

The present invention is embodied in a water heater including a cabinet 10 illustrated in FIGS. 1–3 and a tank assembly 14 illustrated in FIGS. 4–13. A first construction of the tank assembly 14 is illustrated in FIGS. 4–11. With particular reference to FIGS. 9 and 10, the tank assembly 14 includes a tank 18 having a substantially cylindrical shape and a horizontally-extending longitudinal axis 22. The tank 18 includes a shell 24 that is closed at one end by a head 26. A U-shaped flue tube 30 is positioned within the tank 18. The U-shaped flue tube 30 includes two legs 31, 32 communicating through a curved or bent portion 33. The legs 31, 32 terminate in a burner end 34 and an exhaust end 38, respectively, both of which extend through the head 26.

Turning to FIGS. 1–3, the cabinet 10 is mounted on a roof curb 42 on a rooftop 46 of a building, and encloses the tank assembly 14. The cabinet 10 is generally rectangular in shape, having its major axis extending generally horizontally. In this regard, the cabinet 10 has a generally low profile and is similar to other rooftop units such as typical HVAC (e.g., air conditioning) units. As used herein, "low profile" means that the rooftop water heater cabinet 10 cannot typically be seen by a person of average height standing at ground level from a distance of about one city block. The low profile therefore permits the unit to be mounted on a rooftop without detracting from the aesthetics of the building. Roof rails and a pitch pocket or small roof curb may be used as an alternative mounting structure to the roof curb 42 illustrated.

As seen in FIG. 3, the cabinet 10 includes two side panels 50, 54 arranged generally parallel to each other and at right angles to a third side panel or end panel 58. A second end panel or cabinet door 62 is releasably attached at right angles to the two side panels 50, 54 and generally parallel to the end panel 58. The door 62 includes a cutout 66 and a recessed or raised handle 70 to facilitate removal of the door 62 from the rest of the cabinet 10 without the use of tools. An upper panel or top 74 is releasably affixed to the top edges of the other panels 50, 54, 58, 62 of the cabinet 10. The top 74 is preferably removable from the rest of the cabinet 10 without the use of tools. Preferably the door 62 and top 74 are locked to the other panels 50, 54, 58 to resist tampering with the tank assembly 14.

A base member 78 supports the cabinet panels 50, 54, 58, 62, 74 and provides the bottom of the cabinet 10. The base member 78 is supported by the roof curb 42, and a foam tape or other sealing member is preferably interposed between the roof curb 42 and the base member 78 to create a water-tight seal therebetween. A pair of rails 82 are mounted to the underside of the base member 78 and straddle the roof curb 42. The rails 82 define channels along their lengths into which the prongs of a conventional fork lift may be inserted for lifting and lowering the water heater, and also include slots 86 to insert the forklift prongs transverse to the channels. The rails 82 also include apertures 90 for attaching the hooks of a lifting crane to facilitate lifting the water heater to the roof 46 of the building.

When the top and door 74, 62 are removed, the tank assembly 14 is sufficiently exposed to permit a service technician to perform service on the water heater. An electrical disconnect button 94 (FIG. 1) is mounted to one of the side panels 50. The disconnect button 94 permits the service technician to conveniently connect and disconnect power to the water heater while the technician is on the rooftop 46. An electrical outlet 98 (FIG. 1) is also provided to accommodate a service technician's power tools and electric lights. Another feature of the water heater is the provision of local and remote controllers 99, 100, respectively, that include thermostats. The local controller 99 may be mounted on the side panel 50 as illustrated, or it may be mounted within the cabinet 10. The remote controller 100 is mounted in a desirable place within the building. The local and remote controllers 99, 100 each include a digital display of the water temperature within the tank 18, and permit adjustment of the temperature. Thus, the water heater may be monitored and controlled from both the rooftop 46 and from within the building. This arrangement creates convenience for both the building owner or occupant within the building and a service technician on the rooftop 46.

The cabinet panels 50, 54, 58, 62, 74 are joined together around the tank assembly 14 in a weather-tight fashion. As used herein, "weather-tight" means that rain or other precipitation falling on the cabinet 10 from above are substantially prevented from entering the cabinet 10 and interfering with the operation of the water heater. For example, one of the side panels 54 includes an air inlet vent 102 that opens downwardly to cause precipitation to run off the cabinet 10, and the other side panel 50 includes a downwardly-opening exhaust vent 106. In addition to being weather-tight, the edges of the cabinet panels 50, 54, 58, 62, 74 are preferably substantially water-tightly joined to each other (e.g., by welding or with gasket material) to resist or prevent water from entering the cabinet 10 and interfering with the operation of the water heater.

Figure 4:
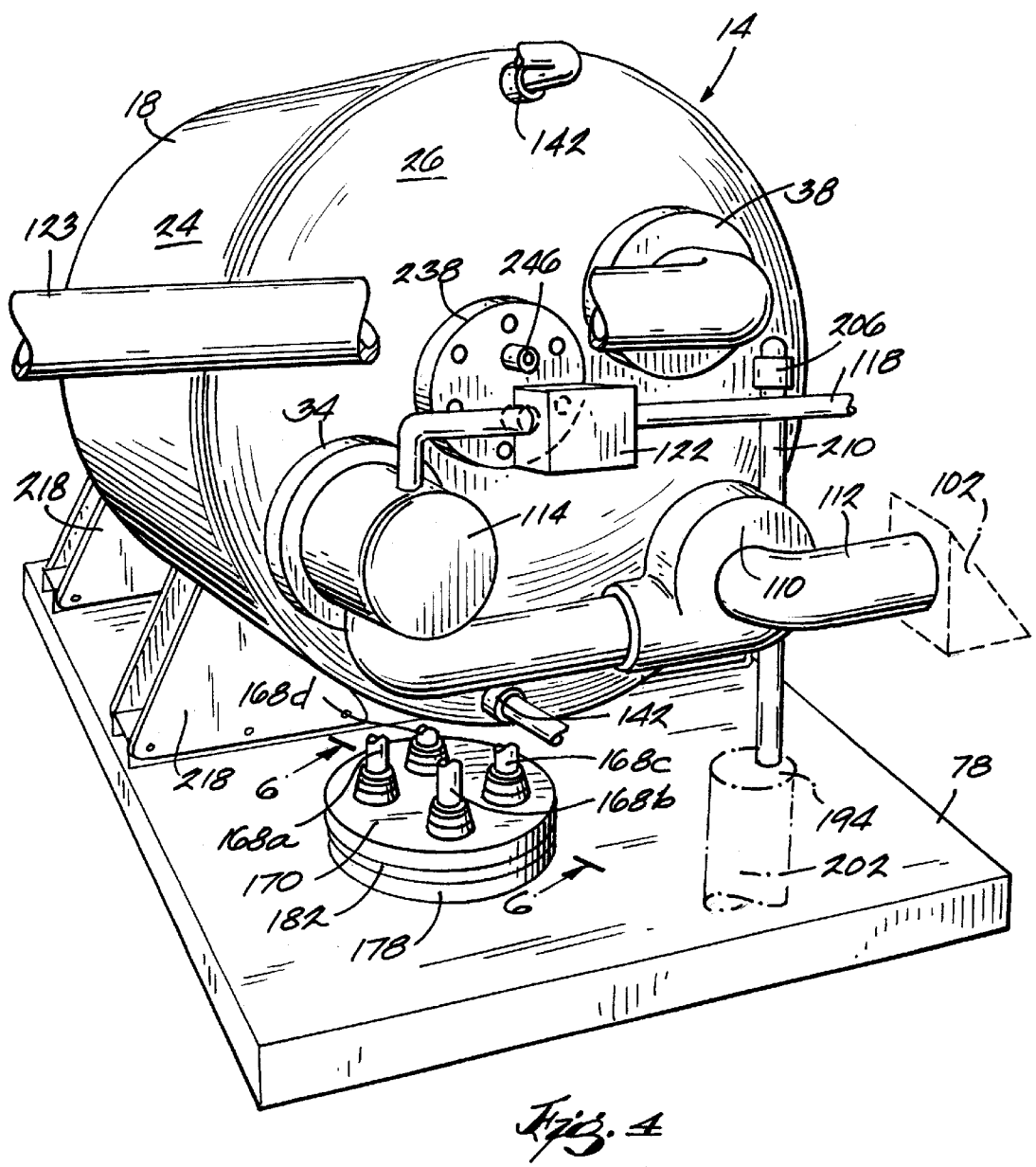
FIG. 4 is a perspective view of the tank assembly of the water heater of FIG. 1.
Figure 1:
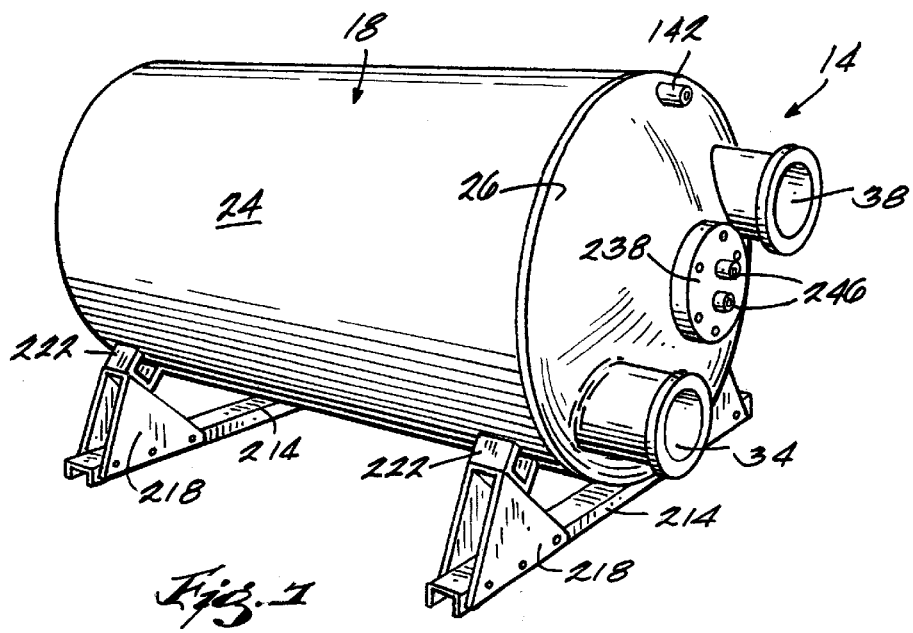

Turning now to FIG. 4, the tank assembly 14 will be discussed in more detail. A fan or combustion blower 110 communicates with the air inlet vent 102 through an inlet duct 112 to deliver air from outside the cabinet 10 to a gas fuel burner 114 positioned at the burner end 34 of the flue tube 30. Gas fuel is also delivered to the burner 114 via a gas pipe 118 and regulator 122. The burner 114 causes combustion of the air and gas fuel, and the products of combustion are forced through the flue tube 30 by the combustion blower 110. The products of combustion heat the water in the tank 18 through the wall of the flue tube 30, and then exit the exhaust end 38 of the flue tube 30. The exhaust vent 106 communicates with the exhaust end 38 of the flue tube 30 through an exhaust duct 123 to permit the spent products of combustion to be exhausted to the surrounding atmosphere.

With additional reference to FIG. 8, a baffle or turbulator 124 is positioned within one of the legs 31, 32 of the U-shaped flue tube 30, and preferably in the upper leg 32. The legs 31, 32 each include a longitudinal axis 125 (FIG. 10), and the longitudinal axes 125 together define a flue plane FP (FIG. 9) that may be disposed substantially vertically, or may be angled with respect to vertical an angle labeled α. Preferably, the angle α is between 30–60° with respect to vertical.

Referring to FIGS. 8–11, an inlet tube 126 and outlet tube 130 are also mounted in the head 26, and extend substantially parallel to the longitudinal axis 22 of the tank 18. The inlet tube 126 is positioned in the bottom portion of the tank 18 below the longitudinal axis 22, and the outlet tube 130 is positioned in the top portion of the tank 18 above the longitudinal axis 22. Preferably, the inlet tube 126, outlet tube 130, and longitudinal axis 22 of the tank 18 are aligned parallel to each other in a vertical plane. This arrangement is made possible in part because the flue plane angle α is greater than zero (i.e., the flue plane FP is non-vertical), which moves the legs 31, 32 of the flue tube 30 from a position in which they would interfere with the extension of the inlet and outlet tubes 126, 130. The tubes 126, 130 are substantially identical to each other and preferably have a length 132 (FIG. 11) slightly shorter than or substantially the same as the interior length 134 of the tank 18 so that cold water is provided and hot water is removed along the entire interior length 134 of the tank 18. The preferred length 132 is between about 37 and 38 inches, but the length 132 will vary depending on the dimensions of the water tank 18. A threaded end 138 is attached at one end of the tubes 126, 130. The threaded end 138 is threaded into a threaded spud 142 in the tank head 26, and includes additional threads to receive a nipple, water pipe, or other plumbing fixture. In a less preferred embodiment, one or both of the tubes 126, 130 may be significantly shorter than illustrated, or the outlet tube 130 may be removed, leaving only the conventional spud 142 to which the building's hot water pipe communicates.

The end 146 opposite the threaded end 138 is closed. The tubes 126, 130 include a plurality of holes, apertures, or openings 150 along their lengths. The tubes 126, 130 preferably have an outer diameter of about one inch, with the holes 150 having a diameter of about 0.25 inches. The hole spacing 154 is preferably about five inches, with the last hole being spaced from the closed end 146 a distance 158 of about 0.5 inches.

In the illustrated construction, all of the openings 150 in the inlet tube 126 face down and all of the openings 150 in the outlet tube 130 face up. Thus, the inlet tube 126 directs cold water toward the bottom of the tank 18 and the outlet tube 130 draws hot water from the top of the tank 18. This is advantageous because the hottest possible water is drawn from the top by the outlet tube 130 while the inlet tube 126 introduces cold water directly at the bottom of the tank 18. The inlet tube 126 therefore evenly distributes water at the bottom of the tank to minimize mixing and thereby maximize heated water drawn from the tank 18. In alternative less preferred constructions, the openings 150 may be arranged around the periphery of the tubes 126, 130 instead of opening in only one direction.

Figure 6:
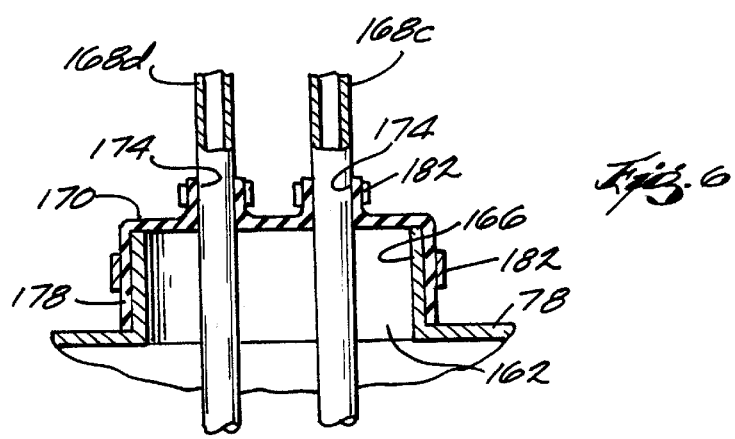
FIG. 6 is a cross-section view taken along line 6—6 in FIG. 4.
Figure 11:
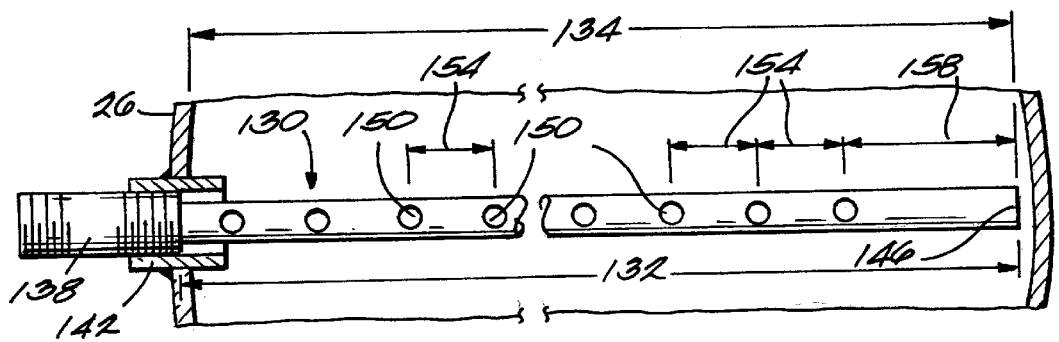
FIG. 11 is a view of the outlet tube taken along line 11—11 in FIG. 10.

As can be seen in FIGS. 3, 4, and 6, the base member 78 includes a water pipe aperture 162 surrounded by a vertical wall 166. Four water pipes 168a, 168b, 168c, 168d (collectively referred to as 168) extend up from the building, through the roof curb 42, and through the aperture 162, and communicate with the water tank 18. A grommet 170 includes apertures 174 water-tightly slip fit around the water pipes 168, and has a depending wall 178 (FIG. 6) water-tightly slip fit over the vertical wall 166. The grommet 170 therefore provides a water-tight seal between the pipes 168 and the base member 78. Suitable clamps 182 can be employed to further tighten the grommet 170 around the vertical wall 166 and pipes 168.

FIGS. 4–6 illustrate the piping system associated with the tank assembly 14. One of the water pipes 168a provides cold water to the water inlet tube 126. Another water pipe 168b removes hot water from the tank 18 through the outlet tube 130, and this hot water is used for dishwashers and other applications requiring very hot water (e.g., between about 120° F. and about 150° F., or a higher temperature if necessary). Another water pipe 168c communicates with a mixing valve 186, and delivers a mixture of hot water and cold water to the warm water faucet of the building's bathrooms and kitchen sink.

The last water pipe 168d communicates between the building's hot water pipes and a circulation pump 190. The circulation pump 190 performs two functions. First, the circulation pump 190 is turned on by the controller 99 (FIG. 1) each time the combustion blower 110 is turned on, and remains active for a set period of time (e.g., about nine minutes) after the combustion blower 110 is turned off. A bypass valve 191 is actuated to route water from the outlet tube 130, through the circulation pump 190, and back into the tank 18 through the inlet tube 126. In this manner, the circulation pump 190 causes hot water to be drawn off the top of the water tank 18 through the outlet tube 130 and recirculated through the cold inlet tube 126 to even out the temperature of the water in the tank 18 and reduce the effects of stacking.

The second function of the circulation pump 190 is to maintain a supply of hot water in the pipes of the building. A thermostat 192 (FIG. 5) may be employed to determine when the temperature in the building's hot water pipes has dropped below an desired temperature (e.g., when a hot water draw has not occurred for an extended period of time). In this case, the bypass valve 191 is turned to permit the circulating pump 190 to circulate the water in the building's hot water pipes into the inlet pipe 126, which forces hot water out the outlet pipe 130 and into pipe 168b. The hot water replaces the water in the building's hot water pipes. The piping system also includes check valves CV and an adjustable gate valve GV (which may be replaced with a fixed valve). The gate valve GV may be used to control the flow rate of recirculated water into and out of the water tank 18.

Referring again to FIG. 3, the base member 78 also includes a drain opening 194 that receives a drain member 198. The drain member 198 communicates with a drain pipe 202 (shown in phantom in FIGS. 1, 2, and 4) in the building, and the drain pipe 202 communicates with the building's sewage system. The drain opening 194 is the only opening in the base member 78 through which water is permitted to flow in the event of a water leak within the cabinet 10. Thus, any water flowing freely within the cabinet 10 drains through the drain opening 194 and is routed to the building's sewage. The tank assembly 14 also includes a drain valve 204 (FIG. 5) that permits the tank 18 to be drained. The valve 204 is preferably positioned over the drain opening 194.

As seen in FIGS. 4 and 8, the water heater also includes a temperature and pressure valve 206, which opens in the event the temperature of the water in the tank 18 becomes too high, or if unacceptable pressure levels are present within the tank 18. A hose or pipe 210 extends down from the temperature and pressure valve 206, and terminates above the drain opening 194. Water is drained from the top of the tank 18 and is fed into the building's sewage system in the event of an overtemperature or overpressure condition in the tank 18.

Referring again to FIGS. 7 and 8, the water tank assembly 14 also includes a pair of support rails 214 extending transverse to the longitudinal axis 22 of the tank 18, and a pair of wedge-shaped supports 218 welded or otherwise affixed to each support rail 214. Tank mounting brackets 222 are attached (e.g., welded) to the tank 18, and a thermally insulated spacer 226 is interposed between the tank mounting brackets 222 and the wedge-shaped supports 218. Suitable fasteners couple the supports 218 to the brackets 222. The tank 18 is surrounded with insulation 230 to reduce heat loss from the tank 18 to the ambient air. The head 26 includes an access opening 234 for cleaning the tank 18 and for applying a glass coating to the inside of the tank 18 during manufacture. An access cover 238 is mounted over the opening 234 and a gasket 242 is employed to prevent leakage of water through the access opening 234. A thermostat and/or an anode tube are mounted in spuds 246 in the access cover 238.

Figure 13:
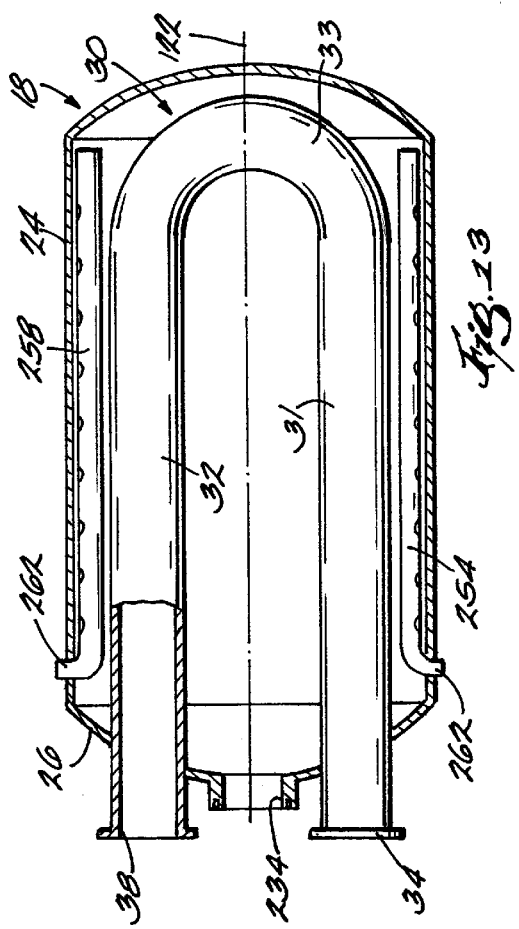
FIG. 13 is a side cross-section view taken along line 13—13 in FIG. 12.
Figure 12:
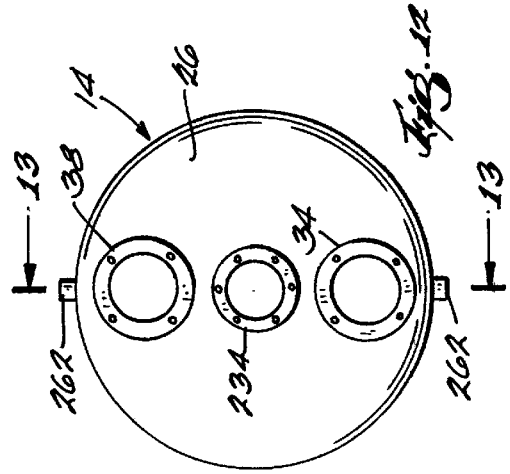
FIG. 12 is an end view of a tank assembly of an alternative construction.

An alternative construction of the tank assembly 14 is illustrated in FIGS. 12 and 13. Here the flue plane FP is substantially vertical, and alternative inlet and outlet tubes 254, 258, respectively, are positioned below and above, respectively, the flue tube 30. A 90° elbow 262 is provided on both the inlet and outlet tube 254, 258 so that the tubes communicate with the building's pipes through the cylindrical shell 24 of the tank 18 and through the insulation 230, rather than through the head 26.

What is claimed is:

1. A water heater comprising:
   a substantially cylindrical water storage tank having a horizontally-extending tank longitudinal axis and having an inside length;
   an inlet tube positioned near the bottom of said water storage tank and extending inside said water tank substantially the entire inside length of said water tank, wherein said inlet tube includes apertures;
   a U-shaped flue tube extending into said water tank, said U-shaped flue tube including first and second substantially straight leg portions, each of said leg portions including a horizontal leg longitudinal axis, said leg longitudinal axes being substantially parallel to each other and together defining a non-vertical flue plane; and
   a gas fuel burner for burning gas fuel and creating products of combustion, said burner communicating with said flue tube such that the products of combustion flow through said flue tube to heat water in said water tank.

2. The water heater of claim 1, wherein both of said leg longitudinal axes are parallel to said tank longitudinal axis.

3. The water heater of claim 1, wherein said flue plane is non-horizontal.

4. The water heater of claim 1, wherein said flue plane is angled between about 30° and 60° with respect to vertical.

5. The water heater of claim 1, wherein said flue plane is angled about 60° with respect to vertical.

6. The water heater of claim 1, wherein said water tank includes a head, and wherein said legs of said U-shaped flue tube extend through said head.

7. The water heater of claim 1, further comprising an inlet tube disposed near the bottom of said water tank, and an outlet tube disposed near the top of said water tank.

8. The water heater of claim 1, further comprising a cabinet having a horizontal major axis and weather-tightly enclosing said water tank.

9. The water heater of claim 8, wherein said cabinet includes a base member supporting said water tank, said base member including a drain opening for draining water from the inside of said cabinet.

10. The water heater of claim 1, further comprising a base member supporting said water tank and including a pipe aperture; at least one pipe extending through said pipe aperture and communicating with said water tank; and a grommet water-tightly sealing said pipe with respect to said base member such that water may only pass through said pipe aperture through said pipe.

11. A water heater comprising:
    a substantially cylindrical water storage tank having a horizontally-extending tank longitudinal axis and having an inside length;
    an inlet tube positioned near the bottom of said water storage tank and extending inside said water tank substantially the entire inside length of said water tank; and
    an outlet tube positioned near the top of said water tank and extending inside said water tank substantially the entire inside length of said water tank.

12. The water heater of claim 11, wherein said inlet tube and said outlet tube each include a tube longitudinal axis, said tube longitudinal axes extending substantially parallel to each other and together defining a vertical plane.

13. The water heater of claim 11, wherein each of said inlet and outlet tubes includes apertures, all of said apertures of said inlet tube opening toward the bottom of said tank and all of said apertures of said outlet tube opening toward the top of said tank.

14. The water heater of claim 11, further comprising a head enclosing one end of said water tank, said inlet and outlet tubes extending through said head.

15. The water heater of claim 11, wherein said water tank includes a substantially cylindrical shell, said inlet and outlet tubes each including an elbow fitting extending through said shell.

16. The water heater of claim 11, further comprising a U-shaped flue tube positioned within said water tank; and a gas fuel burner communicating with said U-shaped flue tube to provide products of combustion to said flue tube.

17. The water heater of claim 11, further comprising a cabinet having a horizontal major axis and weather-tightly enclosing said water tank.

18. The water heater of claim 17, wherein said cabinet includes a base member supporting said water tank, said base member including a drain opening for draining water from the inside of said cabinet.

19. The water heater of claim 11, further comprising a base member supporting said water tank and including a pipe aperture; at least one pipe extending through said pipe aperture and communicating with one of said inlet and outlet tubes; and a grommet water-tightly sealing said pipe with respect to said base member such that water may only pass through said pipe aperture through said pipe.

20. A water heater comprising:
   a substantially cylindrical water storage tank having a horizontally-extending tank longitudinal axis and having an inside length;
   an inlet tube positioned near the bottom of said water storage tank and extending inside said water tank substantially the entire inside length of said water tank;
   an outlet tube positioned near the top of said water tank and extending inside said water tank substantially the entire inside length of said water tank, wherein each of said inlet and outlet tubes includes apertures, all of said apertures of said inlet tube opening toward the bottom of said tank and all of said apertures of said outlet tube opening toward the top of said tank; and
   a U-shaped flue tube extending into said water tank, said U-shaped flue tube including first and second substantially straight leg portions, each of said leg portions including a horizontal leg longitudinal axis, said leg longitudinal axes being substantially parallel to each other and together defining a non-vertical flue plane; and
   a gas fuel burner for burning gas fuel and creating products of combustion, said burner communicating with said flue tube such that the products of combustion flow through said flue tube to heat water in said water tank.

21. A water heater comprising:
   a substantially cylindrical water storage tank having a horizontally-extending tank longitudinal axis and having an inside length;
   an inlet tube positioned near the bottom of said water storage tank and extending inside said water tank substantially the entire inside length of said water tank;
   an outlet tube positioned near the top of said water tank and extending inside said water tank substantially the entire inside length of said water tank;
   a U-shaped flue tube extending into said water tank, said U-shaped flue tube including first and second substantially straight leg portions, each of said leg portions including a horizontal leg longitudinal axis, said leg longitudinal axes being substantially parallel to each other and together defining a non-vertical flue plane; and
   a gas fuel burner for burning gas fuel and creating products of combustion, said burner communicating with said flue tube such that the products of combustion flow through said flue tube to heat water in said water tank,
   wherein said water tank includes a substantially cylindrical shell, said inlet and outlet tubes each including an elbow fitting extending through said shell.

22. A water heater comprising:
   a substantially cylindrical water storage tank having a horizontally-extending tank longitudinal axis;
   an inlet tube extending inside said water tank;
   an outlet tube extending inside said water tank;
   a U-shaped flue tube extending into said water tank, said U-shaped flue tube including first and second substantially straight leg portions, each of said leg portions including a horizontal leg longitudinal axis, said leg longitudinal axes being substantially parallel to each other and together defining a non-vertical flue plane;
   a gas fuel burner for burning gas fuel and creating products of combustion, said burner communicating with said flue tube such that the products of combustion flow through said flue tube to heat water in said water tank;
   a base member supporting said water tank and including a pipe aperture;
   at least one pipe extending through said pipe aperture and communicating with one of said inlet and outlet tubes; and
   a grommet water-tightly sealing said pipe with respect to said base member such that water may only pass through said pipe aperture through said pipe.

23. A water heater comprising:
   a substantially cylindrical water storage tank having a horizontally-extending tank longitudinal axis and having an inside length;
   an inlet tube positioned near the bottom of said water storage tank and extending inside said water tank substantially the entire inside length of said water tank; and
   an outlet tube positioned near the top of said water tank and extending inside said water tank substantially the entire inside length of said water tank,
   wherein each of said inlet and outlet tubes includes apertures, all of said apertures of said inlet tube opening toward the bottom of said tank and all of said apertures of said outlet tube opening toward the top of said tank.

24. A water heater comprising:
   a substantially cylindrical water storage tank having a horizontally-extending tank longitudinal axis and having an inside length;
   an inlet tube positioned near the bottom of said water storage tank and extending inside said water tank substantially the entire inside length of said water tank; and
   an outlet tube positioned near the top of said water tank and extending inside said water tank substantially the entire inside length of said water tank,
   wherein said water tank includes a substantially cylindrical shell, said inlet and outlet tubes each including an elbow fitting extending through said shell.

25. A water heater comprising:
   a substantially cylindrical water storage tank having a horizontally-extending tank longitudinal axis and having an inside length;
   an inlet tube positioned near the bottom of said water storage tank and extending inside said water tank substantially the entire inside length of said water tank;
   an outlet tube positioned near the top of said water tank and extending inside said water tank substantially the entire inside length of said water tank;
   a base member supporting said water tank and including a pipe aperture;
   at least one pipe extending through said pipe aperture and communicating with one of said inlet and outlet tubes; and
   a grommet water-tightly sealing said pipe with respect to said base member such that water may only pass through said pipe aperture through said pipe.

* * * * *